US008531500B2

(12) United States Patent
Sawada (10) Patent No.: US 8,531,500 B2
(45) Date of Patent: Sep. 10, 2013

(54) COMMUNICATION TERMINAL, DISPLAY IMAGE CONTROL METHOD, PROGRAM AND MEDIUM

(75) Inventor: Masaki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 521 days.

(21) Appl. No.: 12/738,880

(22) PCT Filed: Jan. 7, 2009

(86) PCT No.: PCT/JP2009/050402
§ 371 (c)(1),
(2), (4) Date: Apr. 20, 2010

(87) PCT Pub. No.: WO2009/090967
PCT Pub. Date: Jul. 23, 2009

(65) Prior Publication Data
US 2010/0271455 A1    Oct. 28, 2010

(30) Foreign Application Priority Data
Jan. 16, 2008    (JP) .................................. 2008-006748

(51) Int. Cl.
*H04N 7/14*    (2006.01)

(52) U.S. Cl.
USPC ............. 348/14.01; 348/14.02; 348/14.07; 348/14.11; 455/550.1; 709/224

(58) Field of Classification Search
USPC .................. 348/14.01–14.16; 370/259–271, 370/351–356; 709/201–207, 217–248; 455/412.1–426.2, 550.1–560, 575.1–575.9, 455/90.1–90.3
See application file for complete search history.

(56) References Cited

U.S. PATENT DOCUMENTS

| | | | |
|---|---|---|---|
| 6,377,818 B2 * | 4/2002 | Irube et al. ................. | 455/556.1 |
| 6,594,238 B1 * | 7/2003 | Wallentin et al. ............. | 370/252 |
| 6,665,002 B2 * | 12/2003 | Liu ............................ | 348/14.12 |
| 6,690,651 B1 * | 2/2004 | Lamarque et al. ............ | 370/252 |
| 6,747,991 B1 * | 6/2004 | Hemy et al. .................. | 370/468 |
| 6,868,080 B1 * | 3/2005 | Umansky et al. ............. | 370/354 |
| 7,346,007 B2 * | 3/2008 | Curcio et al. ................. | 370/252 |

(Continued)

FOREIGN PATENT DOCUMENTS

| | | |
|---|---|---|
| JP | 2001-298545 A | 10/2001 |
| JP | 2003-150032 A | 5/2003 |

OTHER PUBLICATIONS

International Search Report for PCT/JP2009/050402 mailed Feb. 17, 2009.

(Continued)

*Primary Examiner* — Hemant Patel (57) ABSTRACT

A communication terminal, a display image control method using the communication terminal, a program and a medium are provided in order to display an opposite party's picture on a display part while executing a videophone communication even if it cannot keep sufficient communication quality.

The communication terminal includes a videophone function, a voice communication function and the display part which displays a motion picture or a still picture. The communication terminal displays a picture acquired from an opposite party's communication terminal on a display part as a motion picture while executing the videophone communication. Further, it displays a picture acquired from the opposite party's communication terminal on the display part as a still picture after the videophone communication is switched to the voice communication when the videophone communication could not keep sufficient communication quality.

15 Claims, 6 Drawing Sheets

(56) References Cited

U.S. PATENT DOCUMENTS

| | | | |
|---|---|---|---|
| 7,953,112 B2 * | 5/2011 | Hindus et al. | 370/468 |
| 8,031,771 B2 * | 10/2011 | Chen et al. | 375/240.1 |
| 8,194,643 B2 * | 6/2012 | Bugenhagen | 370/352 |
| 2006/0087687 A1 * | 4/2006 | Eom | 358/1.15 |

OTHER PUBLICATIONS

Japanese Office Action for JP2009-550026 mailed on May 21, 2013 with English Translation.

\* cited by examiner

COMMUNICATION TERMINAL, DISPLAY IMAGE CONTROL METHOD, PROGRAM AND MEDIUM

This application is the National Phase of PCT/JP2009/050402, filed Jan. 7, 2009, which is based upon and claims the benefit of priority from Japanese Patent Application No. 2008-006748, filed on Jan. 16th, 2008, the disclosure of which is incorporated in its entirety by reference.

TECHNICAL FIELD

The present invention relates to communication terminals that have voice communication function, videophone function and display part, display image control methods using the communication terminal, programs and media.

BACKGROUND ART

Some communication terminals have a voice communication function which enables voice communication, and a videophone function which enables videophone communication. These kind of communication terminals include a camera which captures still pictures and motion pictures, a speaker which outputs voices, a microphone which inputs voices, a LCD (liquid crystal displays) which displays pictures and others.

In case of the voice communication, a user's communication terminal acquires a voice using the microphone and transmits it to an opposite party's communication terminal as a voice signal. Further, when the user's communication terminal receives the voice signal from the opposite party's communication terminal, it outputs a voice from the speaker.

On the other hand, in case of the videophone communication, the user's communication terminal acquires a picture which is captured by a camera and transmits it to the opposite party's communication terminal as a picture signal, and at the same time, it acquires a voice using the microphone and transmits it to the opposite party's communication terminal as a voice signal. When the communication terminal receives the picture signal and the voice signal from the opposite party's communication terminal, it displays the picture corresponding to the picture signal on the LCD and also outputs the voice corresponding to the voice signal from the speaker.

In this way, the voice communication can be achieved by a voice processing at the user's communication terminals in case of the voice communication. In addition, the videophone communication can be achieved by a picture processing as well as the voice processing at the user's communication terminals in case of the videophone communication.

An example of this kind of communication terminals is a mobile phone. Japanese Patent Application Laid-Open No. 2007-228351 discloses a mobile phone equipped with a voice communication function and a videophone function. In case of the voice communication, voice signals are transmitted and received between a user's mobile phone and an opposite party's mobile phone. Moreover, in case of the videophone communication, voice signals and picture signals are transmitted and received between the user's mobile phone and the opposite party's mobile phone.

However, when the voice communication and the videophone communication are processed by the mobile phone, noises are generated inside of the mobile phone. In particular, in case of a videophone communication which needs a lot of processes inside the mobile phone, a possibility of noise generation will be increased. When the receiving level of radio wave indicated by such as RSCP (Received Signal Code Power) and RSSI (Received Signal Strength Indicator) or the like is low, quality of the voice and the picture will be declined or the communication will be disconnected occasionally due to noises generated inside the mobile phone.

Therefore, the Japanese Patent Application Laid-Open No. 2004-32804 disclosed a mobile phone which can prevent quality of the voice and the picture from deteriorating or prevent communication from disconnecting even when receiving level of the radio wave is too low to keep the sufficient communication quality. The mobile phone disclosed in Japanese Patent Application Laid-Open No. 2004-32804 switches from the videophone communication to the voice communication when sufficient quality of communication for a picture is lost while executing the videophone communication with an opposite party's mobile phone. Therefore, it can prevent the deteriorations of the voice and the picture as well as prevents the disconnections of the communication.

DISCLOSURE OF THE INVENTION

However, in the above-mentioned Japanese Patent Application Laid-Open No. 2004-32804, when it switches from the videophone communication to the voice communication, there is a problem that the opposite party's picture which is displaying on the videophone communication disappears from a screen of the user's mobile phone. Even if it switches from the videophone communication to the voice communication, considering a situation that a user is using the videophone communication just before the switching, it is desirable that the opposite party's picture should be displayed on the screen of the user's mobile phone like the time when the videophone communication is executed.

Therefore, purpose of the present invention is to provide a communication terminal which can display an opposite party's picture, a display image control method used by the communication terminal, a program and a medium, even when it cannot keep sufficient communication quality to execute the videophone communication.

In order to achieve the above-mentioned purpose, a communication terminal of the present invention includes a videophone communication function and a voice communication function. The communication terminal includes a display part which displays a motion picture or a still picture and a control part which manages the display part to display a motion picture on the display part as a picture that is acquired from an opposite party's communication terminal while executing the videophone communication, and to display a still picture on the display part as a picture which was acquired from the opposite party's communication terminal while the videophone communication was executed after switched from the videophone communication to the voice communication when it could not keep sufficient communication quality to execute the videophone communication.

In addition, display image control method of the present invention includes an image control method of controlling the picture displayed on the display part of the communication terminal that has the videophone function and the voice communication function. The display image control method manages to display a motion picture on the display part as a picture that is acquired from the opposite party's communication terminal while executing the videophone communication, and to display a still picture on the display part as a picture which was acquired from the opposite party's communication terminal while the videophone communication was executed after switched from the videophone communication to the voice communication when it could not keep sufficient communication quality to execute the videophone communication.

In addition, the program in the present invention is a program executed by a computer and controls the picture displayed on the display part of the communication terminal wherein it includes a procedure of displaying a motion picture on the display part as a picture which is acquired from the opposite party's communication terminal while executing the videophone communication, and a procedure of displaying a still picture on the display part as a picture which was acquired while the videophone communication was executed after switched from the videophone communication to the voice communication when it could not keep sufficient communication quality to execute the videophone communication.

Further, a medium of the present invention is the medium that the computer can read and record a program for controlling by the computer the picture that is displayed on the display part of the communication terminal. The medium records the program for carrying out a procedure of displaying acquired picture on the display part as the motion picture during the videophone communication, and a procedure of switching from the videophone communication to the voice communication when it cannot keep sufficient communication quality to execute the videophone communication and displaying a still picture as a picture which was acquired from the opposite party's communication terminal while the videophone communication was executed.

According to the present invention including the communication terminal, the display image control method using the communication terminal, the program and the medium, the communication terminal can display an opposite party's picture on a display of the communication terminal even when it cannot keep sufficient communication quality to execute the videophone communication.

BRIEF DESCRIPTION OF DRAWINGS

The purpose mentioned above and other purposes, features and advantages of the present invention become clear through the following preferred embodiments and associated drawings.

REFERENCE SIGNS LIST 1 mobile phone
9 communication terminal
10 antenna
11 radio part
12 display part
13 camera processing part
14 voice processing part
15 recording part
16 control part

BEST MODE FOR CARRYING OUT THE INVENTION

Figure 1:
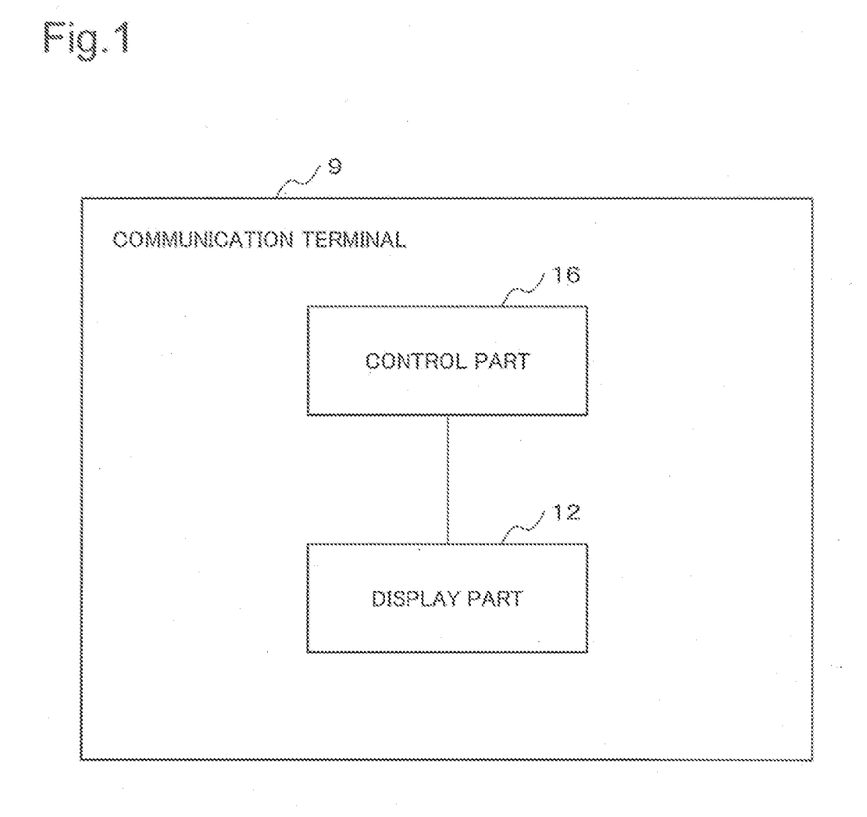
FIG. 1 is a block diagram showing a composition of a communication terminal 9 in the exemplary embodiments.

Next, it will describe an exemplary embodiment for applying the present invention in detail with reference to the accompanying drawings. FIG. 1 is a block diagram showing composition of a communication terminal 9 of the exemplary embodiment. The communication terminal 9 has a display part 12 and a control part 16.

In the explanation of the outline of the embodiment, the control part 16 of the communication terminal 9 manages the display part 12 to display a picture acquired from an opposite party's communication terminal as a motion picture at the time when it is executing a videophone communication with the opposite party's communication terminal (opposite party's communication terminal is not shown in the diagram). Then, when a communication status such as a receiving level of radio wave cannot keep sufficient communication quality to execute the videophone communication, the control part 16 switches from the videophone communication to a voice communication and displays a still picture on the display part 12 which was acquired while executing the videophone communication with the opposite party's communication terminal.

Accordingly, even if the communication terminal 9 switches from the videophone communication to the voice communication because it cannot keep sufficient communication quality to execute the videophone communication, a picture which was acquired while executing the videophone communication with the opposite party is displays on the display part 12.

Here, it can acquire the communication status from an external server or the like, or can detect it by measuring receiving levels of radio wave at the communication terminal 9. A case where a mobile phone 1 as an example of the communication terminal detects the communication status is described as follows.

Figure 2:
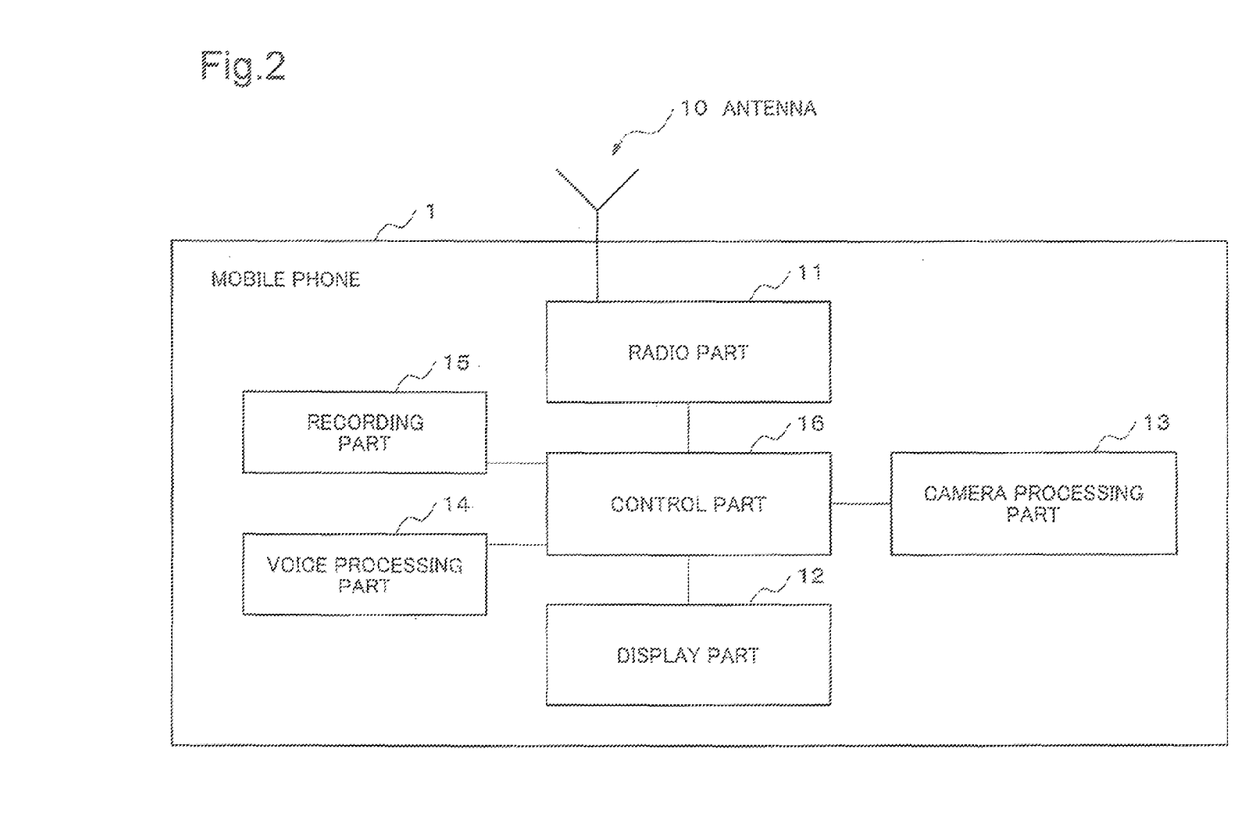
FIG. 2 is a block diagram showing a process flow of a mobile phone 1 in the exemplary embodiments.

FIG. 2 is a block diagram showing composition of the mobile phone 1. The mobile phone 1 includes an antenna 10, a radio part 11, a display part 12, a camera processing part 13, a voice processing part 14, a recording part 15 and a control part 16.

The antenna 10 receives receiving radio waves that are arriving from wireless base stations (wireless base stations are not shown in the diagram). In addition, the antenna 10 transmits a transmitting wave from the radio part 11 to the wireless base stations.

The radio part 11 demodulates the receiving wave from the antenna 10 and sends it to the control part 16 as a received signal. In addition, the radio part 11 modulates a transmission signal from the control part 16 and sends it to the antenna 10 as the transmitting wave.

When the display part 12 receives a picture signal from the control part 16, it displays a picture depending on the signal as either the motion picture or the still picture. The display part 12 includes LCDs, as an example.

The camera processing part 13 converts a picture which is taken by the camera (camera is not shown in the diagram) into a digital signal, and sends it to the control part 16 as the picture signal.

When the voice processing part 14 receives a voice signal from the control part 16, it converts the voice signal into an analog signal, and outputs it from a speaker (speaker is not shown in the diagram) as a voice. In addition, the voice processing part 14 converts a voice inputted from a microphone (microphone is not shown in the diagram) into the digital signal, and sends it to the control part 16 as a voice signal.

The recording part 15 records a threshold value of the receiving level of radio wave for selecting either the voice communication or the videophone communication. When the receiving level of radio wave is not less than the threshold value, the communication of the picture and the voice are executed accurately. That is, since sufficient communication status is kept and an excellent communication quality is secured, the videophone communication is maintained. On the other hand, when the receiving level of radio wave is less than the threshold value, disorder of the picture and the voice and disconnection of the communications may occur. That is, because sufficient communication quality is not kept and the communication quality is not secured, it is difficult to maintain the videophone communication.

According to the exemplary embodiment, a first threshold value and a second threshold value are recorded in the recording part 15. The first threshold value is used for switching from the videophone communication to the voice communication. When a receiving level of radio wave is less than the first threshold value, it switches from the videophone communication to the voice communication. The second threshold value is used for switching from the voice communication to the videophone communication and the value is larger than the first threshold value. When the receiving level of radio wave is not less than the second threshold value, it returns to the videophone communication from the voice communication. Frequent switching between the videophone communication and the voice communication is prohibited by using the first threshold value and the second threshold value that is larger than the first threshold value.

The control part 16 is a processor or the like which is operated by a control program recorded in the recording part 15 in advance, or a control program or the like downloaded from external servers, recording medium or the like. The control part 16 controls operation of the radio part 11, the display part 12, the camera processing part 13 and the voice processing part 14.

The control part 16 sends a picture signal from the camera processing part 13 and a voice signal from the voice processing part 14 to the radio part 11 as a transmission signal.

During execution of the videophone communication, when the control part 16 receives a received signal from the radio part 11, it extracts the picture signal and the voice signal from the received signal. Then, the control part 16 sends the voice signal to the voice processing part 14 and sends the picture signal to the display part 12.

In addition, during execution of the voice communication, when the control part 16 receives a received signal from the radio part 11, it extracts the voice signal from the received signal and sends it to the voice processing part 14.

In the embodiment, the control part 16 periodically measures the receiving level of radio wave during execution of the videophone communication. Further, by comparing the receiving level of the measured radio wave with the threshold value, it determines whether the communication status keeps sufficient communication quality to execute the videophone communication or not. Then, when the communication status cannot keep sufficient communication quality to execute the videophone communication, it switches from the videophone communication to the voice communication. Specifically, the control part 16 compares the receiving level of radio wave with the first threshold value while it is executing videophone communication with the opposite party's mobile phone. Further, if the received level of radio wave is less than the first threshold value, the control part 16 stops the videophone communication, starts the voice communication and displays the picture signal as the still picture which is extracted from the last received signal that was received from the opposite party's mobile phone on the display part 12. In addition, after switching from the videophone communication to the voice communication, the control part 16 compares the receiving level of radio wave with the second threshold value. Then, when the receiving level of radio wave becomes not less than the second threshold value, the control part 16 stops the voice communication and restarts the videophone communication.

Furthermore, it may execute the switching between the videophone communication and the voice communication controlled by Quality of Service (QoS). That is, when it is executing the videophone communication, the control part 16 sets a different priority to the voice signal and the picture signal. Then, when the receiving level of radio wave is high, the control part 16 serves high quality videophone communication by setting higher priority to the picture signal, and when the receiving level of radio wave is low, disposes the picture signal and serves the voice communication composed only of the voice signal.

Figure 3:
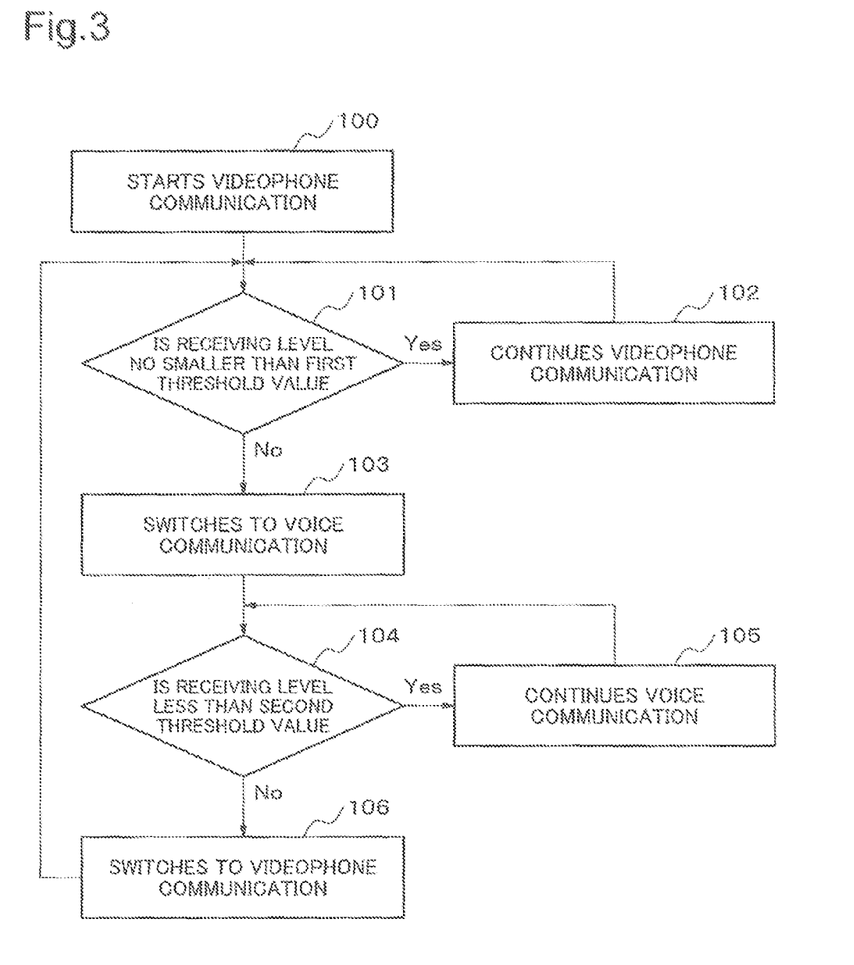
FIG. 3 is a flowchart showing process flow of a mobile phone 1 in the exemplary embodiments.

FIG. 3 is a flowchart showing a process flow of a mobile phone 1 of the exemplary embodiment.

When the control part 16 detects an input such as a keystroke for starting the videophone communication, it starts the videophone communication with the opposite party's mobile phone. In the exemplary embodiment, the control part 16 measures the receiving level of radio wave periodically as well as displays the picture acquired from the opposite party's mobile phone on the display part 12 as the motion picture (Step 100).

The control part 16 compares the measured receiving level of radio wave with the first threshold value (Step 101). After the comparison, if the receiving level of radio wave is not less than the first threshold value, the control part 16 judges that it can keep sufficient communication quality. Then, it continues the videophone communication and returns to Step 101 (Step 102). On the other hand, if the receiving level of radio wave is less than the first threshold value, the control part 16 judges that it cannot keep sufficient communication quality. Then, it switches from the videophone communication to the voice communication and displays the last picture which was transmitted from the opposite party's mobile phone during execution of the videophone communication on the display 12 as the still picture (Step 103).

After it switched from the videophone communication to the voice communication, the control part 16 periodically measures the receiving level of radio wave and compares the receiving level of radio wave with the second threshold value (Step 104). As the result of the comparison, if the receiving level of radio wave is less than the second threshold value, the control part 16 judges that it cannot keep sufficient communication quality. Then, it continues the voice communication and returns to Step 104 (Step 105). On the other hand, if the receiving level of radio wave is not less than the second threshold value, the control part 16 judges that it can keep sufficient communication quality. Then, it switches from the voice communication to the videophone communication. Moreover, the control part 16 starts to compare the receiving level of the measured radio wave with the first threshold value, and also displays the picture acquired from the opposite party's mobile phone on the display part 12 as the motion picture, and it returns to Step 101 (Step 106).

After that, when the control part 16 at any time detects an input such as a keystroke for ending the videophone communication, it ends the videophone communication with the opposite party's mobile phone. Further, the control part 16 displays a call waiting screen on the display part 12 and ends periodic measurement of the receiving level of radio wave.

Figure 4A:
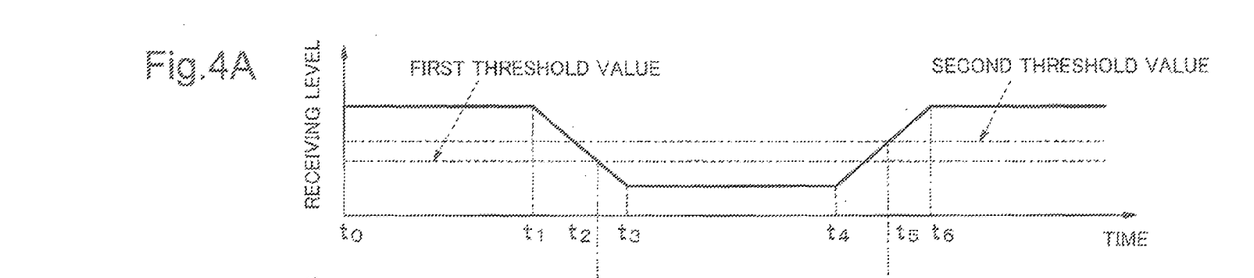
FIGS. 4A-4C are a time chart showing status transition of a mobile phone 1 with progress of time when two threshold values are used.
Figure 4B:
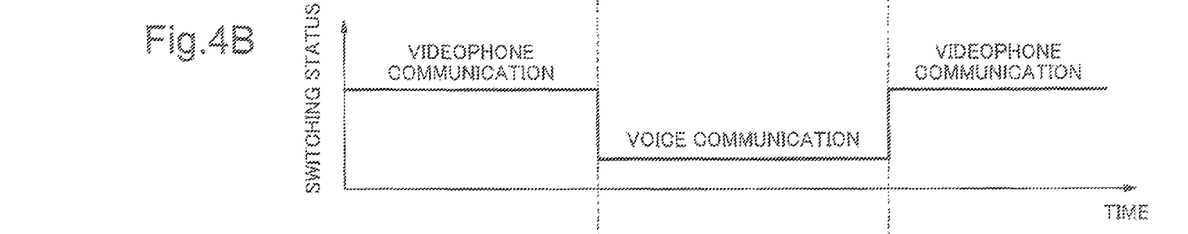
Figure 4C:
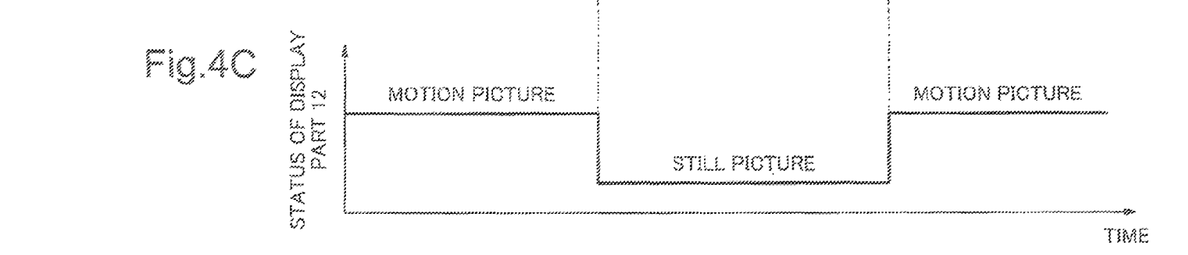

FIG. 4(*a*), FIG. 4B and FIG. 4C are time charts showing a status transition of the mobile phone 1 in the embodiment.

FIG. 4(*a*) is a time chart showing a relationship between an elapsed time and a receiving level of radio wave. In FIG. 4A, the horizontal axis indicates the elapsed time, and the vertical axis indicates the receiving level of radio wave. FIG. 4B is a time chart showing a relationship between an elapsed time and a switching status of the mobile phone. In FIG. 4B, the horizontal axis indicates the elapsed time, and the vertical axis indicates the switching status of the videophone communication or the voice communication. FIG. 4C is a time chart showing a relationship between an elapsed time and the display status of the display part 12. In FIG. 4C, the horizontal axis indicates the elapsed time, and the vertical axis indicates the display status, which is either the motion picture or the still picture, of the display part 12.

First, it describes variation of the receiving level of radio wave with progress of time with reference to FIG. 4A. The receiving level of radio wave is constant from time (t0) to time (t1), and it can keep sufficient communication quality. The receiving level of radio wave degrades from time (t1) to time (t3), and is constant from time (t3) to time (t4), and it cannot keep sufficient communication quality. When time (t4) has passed, the receiving level of radio wave is increased, and time (t6) later, the receiving level of radio wave becomes constant and it returns in the status that it can keep sufficient communication quality.

Next, with reference to FIG. 4A, FIG. 4B and FIG. 4C, it describes a switching process between the videophone communication and the voice communication with progress of time. In FIG. 4A, time (t2) is a time when the videophone communication switches to the voice communication, and time (t5) is a time when the voice communication switches to the videophone communication.

The control part 16 compares the receiving level of radio wave with the first threshold value while executing the videophone communication with the opposite party's mobile phone. Then, if the receiving level of radio wave is not less than the first threshold value (time (t0) to time (t2)), it continues the videophone communication (refer to FIG. 4B). In this case, the control part 16 displays a picture which is transmitted from the opposite party's mobile phone on the display part 12 as a motion picture (refer to FIG. 4C).

The control part 16 compares the receiving level of radio wave with the first threshold value while executing the videophone communication with the opposite party's mobile phone. Then, if the receiving level of radio wave is less than the first threshold value (time (t2)), it switches from the videophone communication to the voice communication (refer to FIG. 4B). In this case, the control part 16 displays a last picture which was transmitted from the opposite party's mobile phone on the display part 12 as a still picture (refer to FIG. 4C).

After that, the control part 16 compares the receiving level of radio wave with the second threshold value. Then, if the receiving level of radio wave is not less than the second threshold value (time (t5)), it switches from the voice communication to the videophone communication (refer to FIG. 4B). In this case, the control part 16 displays a picture which is transmitted from the opposite party's mobile phone on the display part 12 as a motion picture (refer to FIG. 4C).

By using these two threshold values, even if the receiving level of radio wave fluctuates around the threshold values, it can prevent frequent switching between the videophone communication and the voice communication. Accordingly, it can prevent electric power consumption that will be increased due to the switching.

As is described above, according to the exemplary embodiment, even when it cannot keep sufficient communication quality in order to execute the videophone communication, the control part 16 can display on the display 12 a picture which was acquired from the opposite party's mobile phone when videophone communication was executed with the opposite party's mobile phone.

Figure 5A:
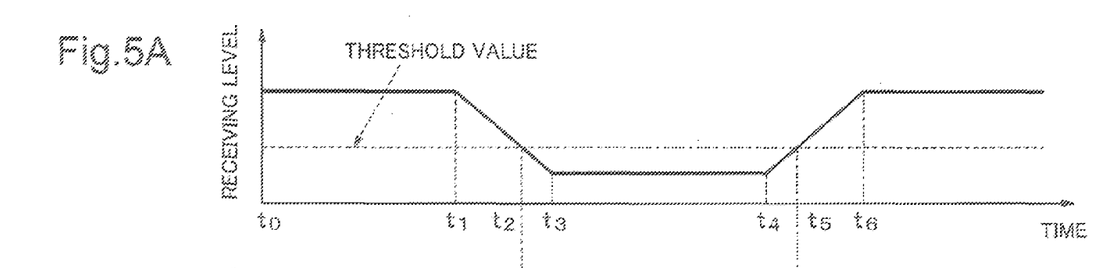
FIGS. 5A-5C are a time chart showing status transition of a mobile phone 1 with progress of time when single threshold value is used.
Figure 5B:
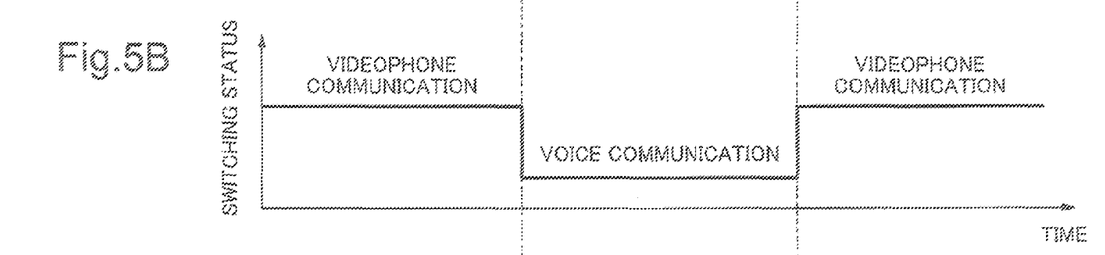
Figure 5C:
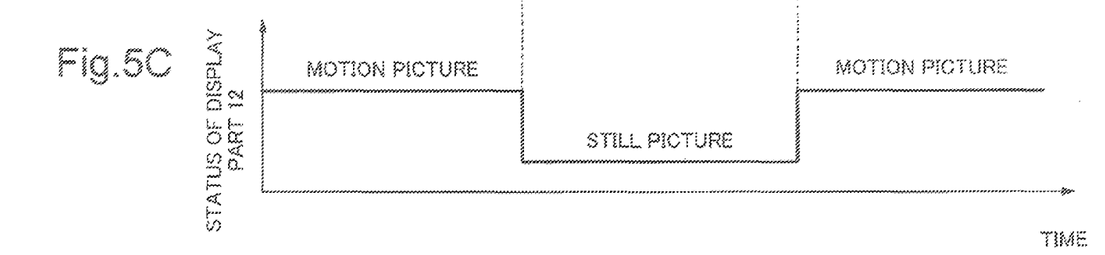

Further, according to the above embodiment, although it indicated a case of a switching procedure between the videophone communication and the voice communication using two threshold values (i.e. the first threshold value and the second threshold value), the present invention is not limited to the embodiment. As an example, it may switch the videophone communication and the voice communication using only one threshold value. With reference to FIG. 5A, FIG. 5B and FIG. 5C, it describes a case where the videophone communication and the voice communication are switched using one threshold value.

In FIG. 5A, time (t2) is a time when the videophone communication switches to the voice communication, and a time (t5) is a time when the voice communication switches to the videophone communication.

The control part 16 compares the receiving level of radio wave with the threshold value while executing the videophone communication with the opposite party's mobile phone. Then, if the receiving level of radio wave is not less than the threshold value (time (t0) to time (t2)), it continues the videophone communication (refer to FIG. 5B). In this case, the control part 16 displays a picture which is transmitted from the opposite party's mobile phone on the display part 12 as a motion picture (refer to FIG. 5C).

The control part 16 compares the receiving level of radio wave with the threshold value while executing the videophone communication with the opposite party's mobile phone. Then, if the receiving level of radio wave is less than the threshold value (time (t2)), it switches from the videophone communication to the voice communication (refer to FIG. 5B). In this case, the control part 16 displays the last picture that was transmitted from the opposite party's mobile phone on the display part 12 as a still picture (refer to FIG. 5C).

After that, the control part 16 compares the receiving level of radio wave with the threshold value. Then, if the receiving level of radio wave is not less than the threshold value (time (t5)), it switches from the voice communication to the videophone communication (refer to FIG. 5B). In this case, the control part 16 displays a picture that is transmitted from the opposite party's mobile phone on the display part 12 as a motion picture (refer to FIG. 5C).

When it uses single threshold value for switching between the videophone communication and the voice communication, processes of the control part 16 can be simplified.

Here, according to the above embodiment, although it indicated an example of displaying a still picture on the display part 12 during the voice communication after switched from the videophone communication to the voice communication, the present invention is not limited to the stated embodiment. For example, it may periodically update the displayed still picture during the voice communication. In this case, even if the receiving level of radio wave is low, it switches from the voice communication to the videophone communication at a predetermined time interval, acquires a picture from the opposite party's mobile phone, and updates the still picture which is displayed on the display part 12 with a newly acquired picture. By updating the picture which is displayed on the display part 12 at a predetermined time interval, a user may feel that the videophone communication is continuing. The following describes a case where the still picture, which is displayed on the display part 12, is updated at a predetermined time interval with reference to FIG. 6A, FIG. 6B and FIG. 6C.

Figure 6A:
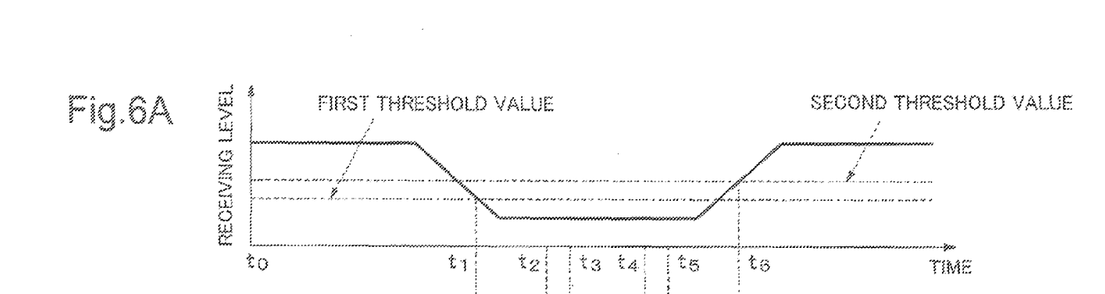
FIGS. 6A-6C are a time chart showing a process flow of updating a displayed picture by switching temporarily to a videophone communication while a voice communication.
Figure 6B:
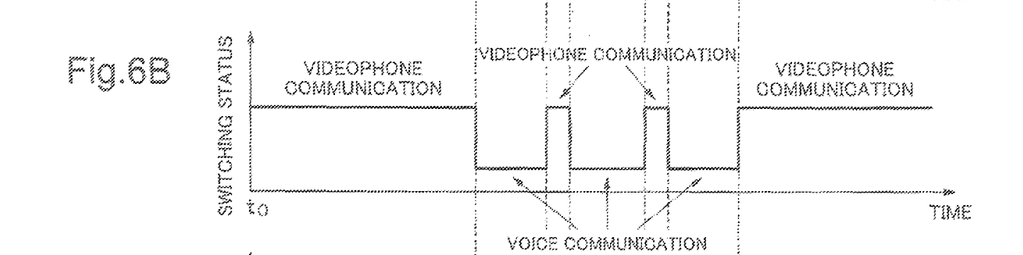

FIG. 6(*a*) shows a receiving level of radio wave with progress of time. During the execution of the voice communication from time (H) to time (t6), the voice communication is switched temporarily to the videophone communication at a predetermined time interval. That is, in FIG. 6B, the voice communication is executed from time (H) to time (t2), from time (t3) to time (t4) and from time (t5) to time (t6), and the videophone communication is executed temporarily from time (t2) to time (t3) and from time (t4) to time (t5).

Figure 6C:
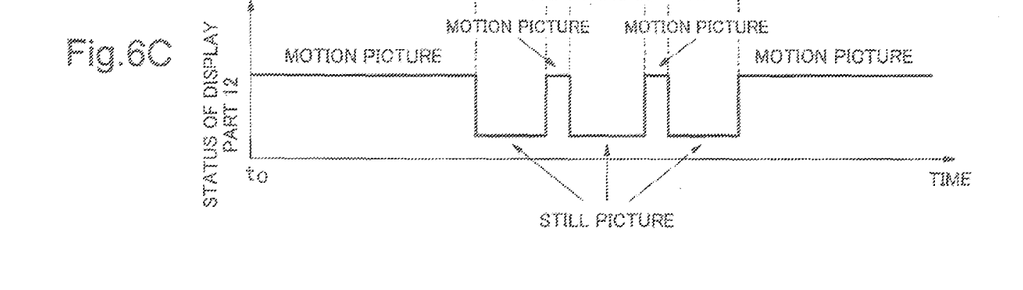

When time (t2) or time (t4) has passed, the control part 16 switches from the voice communication to the videophone communication and displays a motion picture on the display 12 (refer to FIG. 6C). When time (t3) or time (t5) has passed, the control part 16 switches back from the videophone communication to the voice communication and displays a still picture on the display 12 (refer to FIG. 6C). According to the exemplary embodiment, even when a status continues that the receiving level of radio wave is at a low level for a long time, it can periodically update the still picture.

Here, even though the above embodiment describes an example of comparing the receiving level with the threshold values of radio wave, the present invention is not limited to this. As an example, it can use a data transmission speed and so on as a value that indicates the communication status.

In addition, even though the above embodiment describes a mobile phone as an example, the present invention is not limited to the mobile phone. If a communication terminal includes a voice communication function, a videophone function and a display part, it can be applied to a communication terminal of the present invention other than the mobile phone. Here, the display part does not need to unite with the communication terminal. The present invention includes a case where a monitor or the like in a separated configuration is used as a display part.

In addition, it can reduce power consumption by switching from the videophone communication that consumes large power to the voice communication that consumes less power, when it cannot keep sufficient communication quality.

According to the present invention, even if it cannot keep sufficient communication quality in order to execute the videophone communication, it is possible to display the opposite party's picture during the voice communication.

Although it has described the present invention with reference to the above embodiment, the present invention is not limited to the above embodiment. Within the scope the present invention, inventor can modify the present invention to various configurations and embodiments.

[Availability in Industry]

As above stated, a communication terminal, a display image control method using the communication terminal, a program and a medium, that are described in the present invention, can be applied to various communication terminals that includes a voice communication function, a videophone function and a display part, display image control methods using the communication terminals, programs and recording media, such as a mobile phone that includes the voice communication function, the videophone function and displays a picture transmitted from an opposite party's mobile phone.

What is claimed is:

1. A communication terminal with both a videophone communication function and a voice communication function comprising:
    a display unit, a control unit, and a memory;
    the display unit displaying one of a motion picture and a still picture; and
    the control unit displaying one of:
    a picture acquired from an opposite party's communication terminal on said display unit as a motion picture while said terminal executes the videophone communication; and
    a still picture, that was acquired from said opposite party's communication terminal during execution of said videophone communication;
    wherein:
    the memory stores a threshold value having a respective level greater than a cutoff level below which disorder of the videophone function occurs; and
    the control unit displays the still picture instead of the motion picture when a receiving level of the videophone communication is less than the threshold value.

2. The communication terminal according to claim 1, wherein
    said control unit switches from said voice communication to said videophone communication under a condition that said communication status is sufficient for executing said videophone communication after said videophone communication had been switched to said voice communication.

3. The communication terminal according to claim 1, wherein
    said control unit updates said still picture which is displayed on said display unit through acquiring a picture from said opposite party's communication terminal by temporarily switching from said voice communication to said videophone communication in a predetermined time interval after said videophone communication had been switched to said voice communication.

4. The communication terminal according to claim 1, wherein
    said control unit switches from said videophone communication to said voice communication when said receiving level of radio wave is less than said threshold value while executing said videophone communication, and switches from said voice communication to said videophone communication when said receiving level of radio wave is not less than said threshold value after said videophone communication had been switched to said voice communication.

5. The communication terminal according to claim 1, wherein
    said memory stores a first threshold value and a second threshold value that is larger than said first threshold value as said threshold value, and
    said control unit switches from said videophone communication to said voice communication when said receiving level of radio wave is less than said first threshold value while executing said videophone communication, and switches from said voice communication to said videophone communication when said receiving level of radio wave is not less than said second threshold value after said videophone communication had been switched to said voice communication.

6. The communication terminal according to claim 1, wherein
said control unit displays on said display unit the last picture as said still picture which was acquired from said opposite party's communication terminal when it was executing said videophone communication after said videophone communication had been switched to said voice communication.

7. The communication terminal according to claim 1, wherein said communication terminal is a mobile phone.

8. A display image control method of controlling a picture which is displayed on a display part of a communication terminal which has a videophone communication function and a voice communication function, comprising:
storing, in a memory, a threshold value having a respective level greater than a cutoff level below which disorder of the videophone function occurs;
displaying a picture as a motion picture acquired from the opposite party's communication terminal on said display part while executing said videophone communication,
switching from said videophone communication to said voice communication, and displaying said picture as the still picture which was acquired from said opposite party's communication terminal, while said videophone communication was executing on said display, when a receiving level of the videophone communication is less than the threshold value.

9. The display image control method according to claim 8, further comprising:
switching from said voice communication to said videophone communication when said communication status keeps sufficient communication quality to execute the videophone communication, after said videophone communication had been switched to said voice communication.

10. The display image control method according to claim 8, further comprising:
temporarily switching from said voice communication to said videophone communication in the predetermined time interval, acquiring a picture from said opposite party's communication terminal and updating said still picture which is displayed on said display part, after said videophone communication had been switched to said voice communication.

11. The display image control method according to claim 8, further comprising:
deciding on whether said communication status keeps sufficient quality to execute said videophone communication or not by comparing a receiving level of radio wave with a threshold value.

12. The display image control method according to claim 11, further comprising:
switching from said videophone communication to said voice communication when said receiving level of radio wave is less than said threshold value while executing said videophone communication, and
switching from said voice communication to said videophone communication when said receiving level of radio wave is not less than said threshold value after said videophone communication had been switched to said voice communication.

13. The display image control method according to claim 11, further comprising:
switching from said videophone communication to said voice communication when said receiving level of radio wave is less than a first threshold value while executing said videophone communication, and
switching from said voice communication to said videophone communication when said receiving level of radio wave is not less than a second threshold value that is larger than said first threshold value after said videophone communication had been switched to said voice communication.

14. The display image control method according to claim 8, further comprising:
displaying a last picture as said still picture which was acquired from said opposite party's communication terminal when said videophone communication was executed after said videophone communication had been switched to said voice communication.

15. A communication terminal with both a videophone communication function and a voice communication function comprising:
a display means, a control means, and a memory;
the memory storing a threshold value having a respective level greater than a cutoff level below which disorder of the videophone function occurs;
the display means displaying one of a motion picture and a still picture; and
the control means displaying one of:
a picture acquired from an opposite party's communication terminal on said display means as a motion picture while said terminal executes the videophone communication, and
a still picture that was acquired from said opposite party's communication terminal during execution of said videophone communication;
wherein, when a receiving level of the videophone communication is less than the threshold value, the control unit displays the still picture instead of the motion picture.

* * * * *